United States Patent

Nakato et al.

[11] Patent Number: 6,120,578
[45] Date of Patent: Sep. 19, 2000

[54] METHOD OF PRODUCING CLUSTER-FREE AL-KILLED STEEL

[75] Inventors: Hakaru Nakato; Seiji Nabeshima; Kenichi Sorimachi, all of Kurashiki, Japan

[73] Assignee: Kawasaki Steel Corporation, Japan

[21] Appl. No.: 08/945,668

[22] PCT Filed: Mar. 25, 1997

[86] PCT No.: PCT/JP97/00989

§ 371 Date: Oct. 31, 1997

§ 102(e) Date: Oct. 31, 1997

[87] PCT Pub. No.: WO97/36010

PCT Pub. Date: Feb. 10, 1997

[30] Foreign Application Priority Data

Mar. 25, 1996 [JP] Japan .................................. 8-092983

[51] Int. Cl.[7] .................. C21C 7/06; C21C 7/04
[52] U.S. Cl. .................. 75/568; 75/560; 148/625
[58] Field of Search .................. 148/625, 626; 75/560, 568

[56] References Cited

U.S. PATENT DOCUMENTS

| 4,956,009 | 9/1990 | Robison, Jr. ............... 75/307 |
| 5,207,844 | 5/1993 | Watanabe et al. .......... 148/546 |
| 5,234,512 | 8/1993 | Inoue et al. ............... 148/541 |

FOREIGN PATENT DOCUMENTS

| 54-041215 | 4/1979 | Japan . |
| 56-009316 | 1/1981 | Japan . |
| 2 003 726 | 11/1993 | Russian Federation . |
| 1 092 294 | 12/1983 | U.S.S.R. . |
| 1 752 812 | 8/1992 | U.S.S.R. . |

*Primary Examiner*—Sikyin Ip
*Attorney, Agent, or Firm*—Austin R. Miller

[57] ABSTRACT

An alloy of Al and two or more of Ca, Mg and REM is added as a deoxidizing agent to molten steel, and the amount of $Al_2O_3$ in the resulting inclusion is adjusted to a range of 30–85 wt % to obtain an alumina cluster-free Al-killed steel.

4 Claims, 2 Drawing Sheets

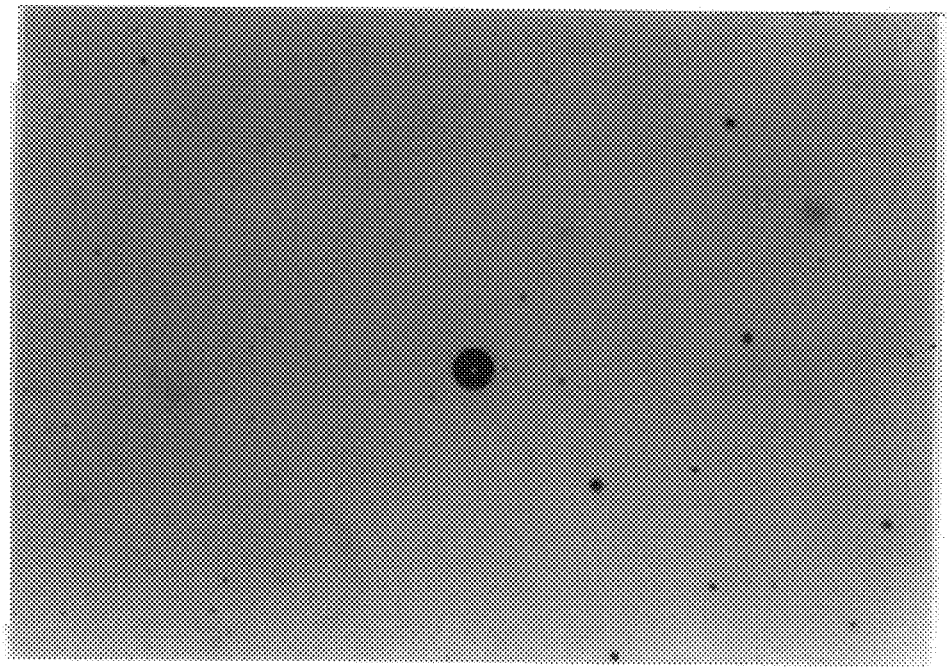
FIG. 2a  25μm
FIG. 2b  25μm

METHOD OF PRODUCING CLUSTER-FREE AL-KILLED STEEL

TECHNICAL FIELD

This invention relates to a method of producing Al-killed steel for obtaining a defect-less and clean steel product by deoxidizing molten steel without producing alumina clusters.

BACKGROUND ART

In general, in the production of Al-killed steel, pig iron is decarburized and refined in a converter and tapped into a ladle, and is deoxidized with Al to remove oxygen in molten steel as an oxide, and adjusted to proper composition, and then continuously cast to obtain a cast slab.

In the above deoxidation with Al, means are provided for aggregating and coalescing the oxide through gas agitation or in a RH degassing device to promote the floating of the oxide, but the oxide or alumina inevitably remains in the cast slab.

Such alumina is liable to form clusters. Particularly, when a cluster is caught in a surface layer portion of the cast slab, a surface quality of an extremely-thin steel sheet product such as steel sheet for automobiles, requiring a beautiful appearance, is damaged. In this type of steel sheet, therefore, it is very important to prevent the occurrence of alumina clustesr.

As a means of deoxidizing steel for preventing the formation of alumina clusters, there has hitherto been proposed and disclosed a method of subjecting molten steel (high-carbon steel) to composite deoxidation treatment with an alloying agent consisting of Ca: 10–30%, Al: 2–20%, Mg: 1–15%, Si: 10–60%, Ba: 10–30% and the balance of Fe in, for example, JP-A-51-5224 (method of producing high-cleaned steel).

However, such an alloying agent contains Ba, so that when it is added to molten steel as a deoxidizing agent, there is a problem in the maintenance of the working environment. And also, it contains 10–60% of Si, so that Si remains in molten steel. For this end, it can not be used in the steel sheet for automobiles requiring severe work. Further, when the above alloying agent is used, Ca and Mg having a high steam pressure are added in relatively greater amounts, so that the yield after the addition to molten steel becomes variable. Therefore, the formation of composite inclusions from alumina clusters and the shape controllability of the inclusion become unstable, so that the effect of preventing the formation of alumina clusters becomes variable.

In JP-A-54-116312 (deoxidizing alloy for molten steel) is proposed and disclosed a deoxidizing alloy for molten steel containing 2–10 mol % of one or more elements of Group IIIa (Y, Ce, La and so on) to Al.

However, when deoxidation is carried out by using such a deoxidizing alloy for molten steel, it is effective to prevent the formation of dendritic oxide inclusion and the prevention effect for big clusters is observed, but it is insufficient to reduce clusters having a diameter of about 100 $\mu$m, which comes into problems in the steel sheets for automobiles, and also there is a problem that the floating and separating properties of the resulting oxide inclusions are poor.

DISCLOSURE OF INVENTION

The invention advantageously solves the aforementioned problems and provides a method of producing clean Al-killed steel having no alumina clusters, and less defects.

The inventors have made experiments and investigations for solving the problems of the above conventional techniques and as a result the invention has been accomplished. The methods of the invention advantageously achieving the forgoing are as follows.

1. A method of producing cluster-free Al-killed steel containing soluble Al: not less than 0.005 wt %, which comprises charging an alloy consisting of Al and two or more elements selected from Ca, Mg and REM into the molten steel to conduct deoxidation, and adjusting $Al_2O_3$ in the resulting inclusion to a range of 30–85 wt % (first invention).

2. A method of producing cluster-free Al-killed steel according to the first invention, wherein the composition of the alloy satisfies the following equation (1) (second invention):

$$[Ca(wt\%)+Mg(wt\%)+REM(wt\%)]/Al(wt\%) \leq 0.5 \quad (1)$$

3. A method of producing cluster-free Al-killed steel according to the first invention, wherein a composition of the alloy satisfies the relation of the following equations (2) and (3) (third invention):

$$[Ca(wt\%)+Mg(wt\%)]/Al(wt\%) \leq 0.3 \quad (2)$$

$$REM(wt\%)/Al(wt\%) \leq 0.1 \quad (3)$$

4. A method of producing cluster-free Al-killed steel according to the first, second or third invention, wherein the molten steel is subjected to a preliminary deoxidation so as to provide free oxygen in the molten steel of not more than 200 wtppm (fourth invention).

The function and effect of the invention will be described below.

At first, the reason why the invention is restricted to Al-killed steel containing not less than 0.005 wt % of soluble Al is due to the fact that when the amount of soluble Al is less than 0.005 wt %, Al forms a composite inclusion with alloying components included in molten steel such as Si, Mn and the like and hence alumina clusters hardly occur, and the application of the invention is not particularly necessary.

Then, the invention will be described with respect to the deoxidizing agent of the alloy.

The alloy used as a deoxidizing agent is an alloy of Al and two or more of Ca, Mg and REM (Ce, La and the like) obtained by previously melting and homogenizing them.

The reason why the deoxidizing agent is the alloy of Al and two or more of Ca, Mg and REM is due to the fact that when the alloy is Al and one of Ca, Mg and REM, the formation of composite inclusion and the shape control thereof become unstable, and the effect of preventing the formation of alumina clusters is insufficient, and hence the effect of satisfactorily improving the surface quality in the thin steel sheet can not be achieved.

In FIG. 1 is a graph showing the relation between the concentration of a metallic element (Ce, Ca, Mg, Al, Si) at a temperature of 1600° C. and the oxygen activity ($a_O$).

In FIG. 1, for example, when the activity of $Al_2O_3$ is 0.5 the activity of CaO is 0.2 and the activity of $Ce_2O_3$ is 0.2 in a low melting point composite inclusion forming no alumina cluster, if the Al in the molten steel is 150 wtppm, the equivalent Ca and Ce are 6 wtppm and 3 wtppm, respectively. Such compositions of molten steel and composite inclusion are obtained by deoxidizing with a small amount of Mg-REM-Al alloy.

Further, when the activity of $Al_2O_3$ is 0.5, the activity of MgO is 0.2 and the activity of $Ce_2O_3$ is 0.2 in the composite inclusion, if the Al in the molten steel is 150 wtppm, equivalent amounts of Mg and Ce are 12 wtppm and 3 wtppm, respectively. Such compositions of molten steel and composite inclusions are obtained by deoxidizing with a small amount of Mg-REM-Al alloy.

The composition of the alloy as the deoxidizing agent is preferred to be the a value of (Ca+Mg+REM)/Al represented as wt %, is not more than 0.5.

When the value exceeds 0.5, the desired inclusion composition is not obtained. When greater amounts of CaO and MgO are included in the composition of the inclusion, if they appear at the surface of the product, there may be caused a problem of generating rust. On the other hand, when a greater amount of REM oxide is included, the shape of the resulting inclusion becomes square and the degree of controlling the formation of clusters is insufficient.

Preferably, the alloy has a composition that the value of (Ca+Mg)/Al is not more than 0.3 and the value of REM/Al is not more than 0.1, and it is possible to relatively easily obtain a desired composition of the composite inclusion by addition at once. When the value of (Ca+Mg)/Al exceeds 0.3, not only the increase of rust generation is brought about, but also the cost of the alloying agent becomes high. When the value of REM/Al exceeds 0.1, individual sulfides and oxides of REM are apt to be produced owing to strong deoxidation and desulfurization abilities of the REM. Such sulfide and oxide of REM have high specific gravity, so that it is difficult to separate and remove them from molten steel.

In the invention, it is important to adjust the concentration of $Al_2O_3$ in the resulting composite inclusion to a range of 30–85 wt %. Preferably, the $Al_2O_3$ concentration is within a range of 30–70 wt %.

This is due to the fact that when the $Al_2O_3$ concentration is less than 30 wt % or exceeds 85 wt %, the effect of the invention is not obtained and the melting point of the composite inclusion (oxide inclusion) produced even in both cases becomes higher and hence the surface quality of the thin steel sheet is not improved.

In addition, when the $Al_2O_3$ concentration in the composite inclusion is less than 30 wt %, the amounts of CaO and MgO become relatively large. If the composite inclusion having such a composition is existent in molten steel, it may result in rust generation in the thin steel sheet. When the $Al_2O_3$ concentration exceeds 85 wt %, there are problems that nozzle clogging in the casting and occurrence of sliver flaws in the thin steel sheet can not be prevented, and the like.

When the $Al_2O_3$ concentration is not more than 70 wt %, the effect of preventing clusters becomes more stable and the effect of improving the surface quality is remarkable. Therefore, the preferable $Al_2O_3$ concentration is not more than 70 wt %.

Further, the composite inclusion has a more preferable composition that the $Al_2O_3$ concentration is within a range of 30–85 wt % and a value of (CaO+MgO)/$Al_2O_3$ by weight ratio is within a range of 0.5–0.8.

In the invention, the alloy used as the deoxidizing agent is expensive as compared with Al, so that it is desirable to reduce the addition amount within a range capable of adjusting the composition of the composite inclusion. For this purpose, it is very effective to preliminarily deoxidize a concentration of free oxygen in molten steel to not more than 200 wtppm prior to the addition of the alloy from a viewpoint of economical reasons. Such a preliminary deoxidation may be carried out by agitation of molten steel under vacuum, deoxidation with C, light deoxidation with Al, deoxidation with Si or FeSi or the like, which does not affect the effect of the invention.

BRIEF DESCRIPTION OF THE DRAWINGS

FIG. 2 is a photograph of a metal structure showing a shape of an inclusion, wherein (a) is a case of deoxidizing with an alloy and (b) is a case of deoxidizing with Al.

BEST MODE FOR CARRYING OUT THE INVENTION

EXAMPLE 1

Figure 1:
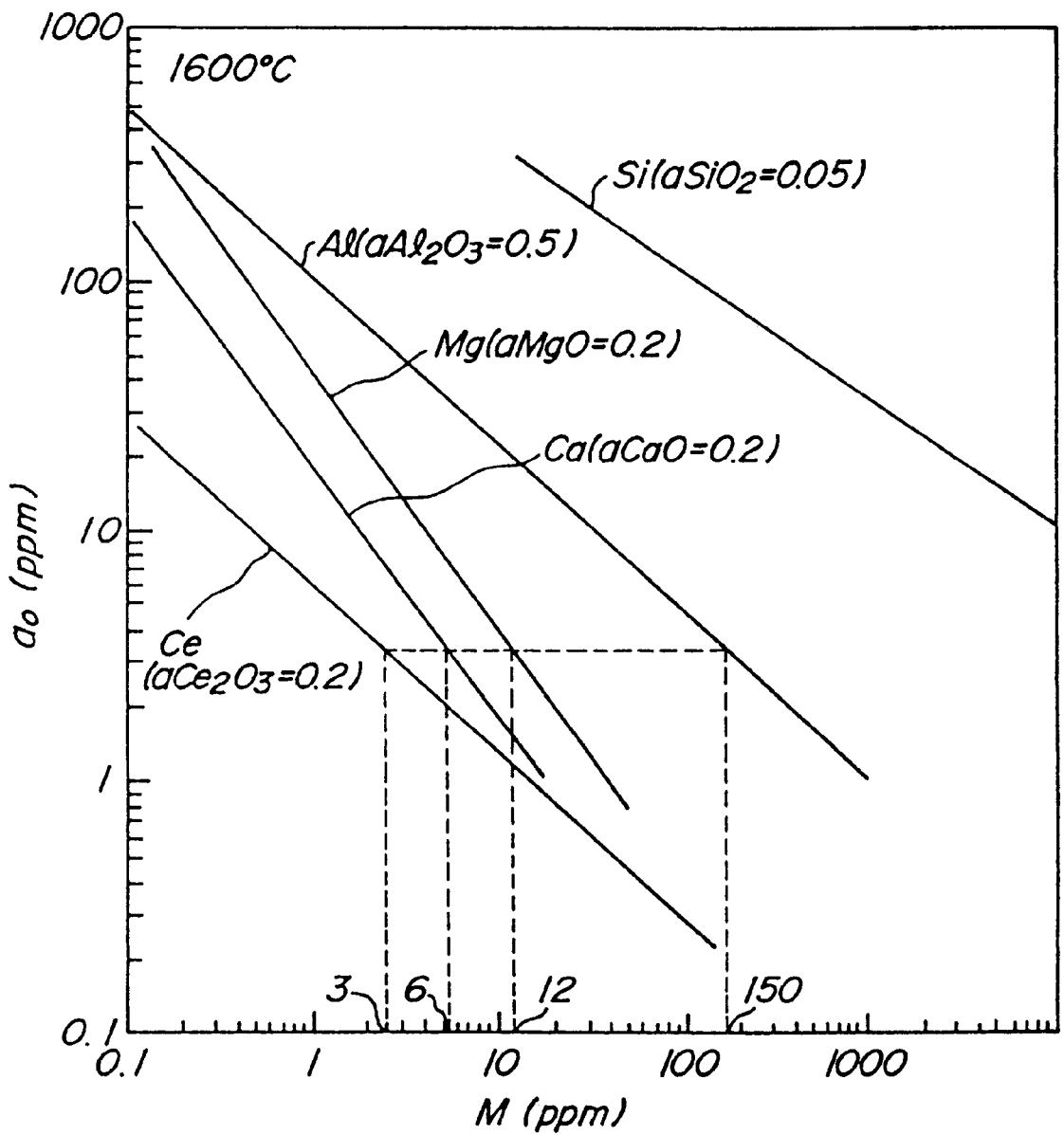
FIG. 1 is a graph showing the relation between the concentration of various metallic elements at a temperature of 1600° C. and the corresponding oxygen activity.

Molten steel containing C: 0.01 wt %, Si: tr, Mn: 0.2 wt %, P: 0.010 wt % and S: 0.010 wt % was prepared in a high frequency melting furnace of 30 kg in capacity and carbon particles were added to conduct preliminary deoxidation while being held at a temperature of 1600° C., whereby molten steel having free oxygen: 130 wtppm was obtained.

After the molten steel was deoxidized by adding 0.8 kg/t of 79 wt % Al-16 wt % Ca-5 wt % REM alloy, it was cast to obtain a steel ingot containing C: 0.02 wt %, Si: tr, Mn: 0.2 wt %, P: 0.010 wt % and S: 0.010 wt %.

A photograph of a metal structure showing the shape of an inclusion in the thus obtained steel ingot is shown in FIG. 2(a) together with a photograph of FIG. 2(b) showing the product made through usual deoxidation with only Al, as a comparison.

As seen from FIG. 2(a) based on the above deoxidation with the alloy has no clusters of the kind seen in FIG. 2(b) based on the deoxidation with Al, but a spherical composite inclusion is formed therein as shown in FIG. 2(a).

EXAMPLE 2

Molten steel having free oxygen: 180 wtppm was prepared by preliminary deoxidation after molten steel having the same composition as in Example 1 was prepared in the same melting furnace as in Example 1. After the thus obtained molten steel was deoxidized by adding 0.6 kg/t of 78 wt % Al-15 wt % Mg-7 wt % REM alloy, it was cast to obtain a steel ingot having substantially the same composition as in Example 1.

As a result of investigating the inclusion in the thus obtained steel ingot, all inclusions were spherical and had a composite composition of $MgO$-$Al_2O_3$-$Ce_2O_3$.

EXAMPLE 3

Molten steel containing C: 0.03 wt %, Si: tr, Mn: 0.02 wt %, P: 0.015 wt % and S: 0.010 wt % was prepared in a top-and bottom-blown converter of 280 t.

After decarburization treatment was carried out by refluxing molten steel in a RH degassing device, preliminary deoxidation was conducted by using 0.7 kg/t of metallic Al. In this case, the temperature of the molten steel before the treatment was 1605° C., and free oxygen in the molten steel lowered from 600 wtppm to 180 wtppm for the refluxing time of 5 minutes. The total oxygen in the molten steel was 190 wtppm after the treatment. And also, C was 18 wtppm.

Thereafter, the molten steel was modified with addition of 0.8 kg/t of 79% Al-10% Ca-6% Mg-5% REM alloy and subjected to a refluxing treatment for 10 minutes.

The temperature of the molten steel after the treatment was 1585° C. and the total oxygen in the molten steel was 18 ppm.

The thus obtained molten steel of Al-alloy killed steel was poured into a continuously casting mold of 220×1200 mm through a tundish and cast at a casting rate of 2.0 m/min to obtain a cast slab. This cast slab was heated and subjected to hot rolling and cold rolling to obtain a cold rolled steel sheet having a thickness of 0.8 mm and then the reject rate of surface defects was measured.

As a result, the reject rate of surface defects (weight ratio) in the conventional single Al-killed steel was 0.8%, while the reject rate of surface defects in the above obtained cold rolled steel sheet was 0%. And also, the inclusion in the cold rolled steel sheet had an $Al_2O_3$ concentration of 30–70.

Thus, the Al-killed cold rolled steel sheet produced by the invention had no alumina clusters and was very excellent in surface quality and had no surface defect resulting from any inclusion.

INDUSTRIAL APPLICABILITY

In the production of Al-killed steel according to the invention, an alloy of Al and two or more elements selected from Ca, Mg and REM is used as a deoxidizing agent and the concentration of $Al_2O_3$ in the resulting inclusion is adjusted to a range of 30–85 wt %.

According to the invention, there can be produced alumina cluster-free Al-killed steel and it is possible to previously prevent the occurrence of defects resulting from alumina clusters as a drawback in the Al-killed steel. Furthermore, the Al-killed steel produced by the invention is advantageously applicable in not only thin steel sheet for automobiles but also high-carbon steels for bearings or springs, steel for thick plates or pipes, stainless steel and the like.

What is claimed is:

1. A method of producing cluster-free Al-killed steel containing soluble Al in an amount not less than 0.005 wt %, which comprises charging an alloy consisting of Al, REM, and Ca and/or Mg into molten steel to conduct deoxidation, and adjusting the amount of $Al_2O_3$ in the resulting inclusion to a range of 30–85 wt %.

2. A method of producing cluster-free Al-killed steel according to claim 1, wherein the composition of said alloy satisfies the following equation (1):

$$[Ca(wt\ \%)+Mg(wt\ \%)+REM(wt\ \%)]/Al(wt\ \%) \leq 0.5 \qquad (1).$$

3. A method of producing cluster-free Al-killed steel according to claim 1, wherein the composition of said alloy satisfies the following equations (2) and (3):

$$[Ca(wt\ \%)+Mg(wt\ \%)]/Al(wt\ \%) \leq 0.3 \qquad (2)$$

$$REM(wt\ \%)/Al(wt\ \%) \leq 0.1 \qquad (3).$$

4. A method of producing cluster-free Al-killed steel according to any one of claims 1–3, wherein said molten steel is subjected to a preliminary deoxidation so as to provide free oxygen context in said molten steel of not more than 200 wtppm.

* * * * *